(12) United States Patent
Enns et al.

(10) Patent No.: US 8,807,076 B2
(45) Date of Patent: *Aug. 19, 2014

(54) APPARATUS FOR VAPOR PHASE PROCESSING OPHTHALMIC DEVICES

(75) Inventors: John B. Enns, Jacksonville, FL (US); Michael F. Widman, Jacksonville, FL (US); Joe M. Wood, Jacksonville, FL (US); P. Mark Powell, Jacksonville, FL (US); Ture Kindt-Larsen, Holte (DK)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/722,820

(22) Filed: Mar. 12, 2010

(65) Prior Publication Data

US 2011/0220021 A1 Sep. 15, 2011

(51) Int. Cl.
*B05C 13/02* (2006.01)
*B05C 11/10* (2006.01)
*B28B 17/00* (2006.01)
*B29D 11/00* (2006.01)

(52) U.S. Cl.
CPC .... *B29D 11/00865* (2013.01); *B29D 11/00923* (2013.01); *B29D 11/00009* (2013.01)
USPC ............. 118/641; 118/50; 118/663; 118/500; 118/728; 425/174.4; 425/174

(58) Field of Classification Search
CPC .......................... B29D 11/00009; B05C 11/10
USPC ........... 118/326, 50, 728, 500, 684, 712, 719, 118/641–643, 724, 663; 264/1.1, 1.33, 264/1.36, 1.37, 1.38, 1.3; 425/174.4, 445, 425/808, 174; 427/164, 168; 428/220
See application file for complete search history.

(56) References Cited

U.S. PATENT DOCUMENTS

| 3,953,652 | A | * | 4/1976 | Addiss et al. ................. 428/412 |
| 4,096,315 | A | * | 6/1978 | Kubacki ........................ 428/412 |
| 4,237,183 | A | * | 12/1980 | Fujiwara et al. .............. 428/336 |
| 4,518,390 | A | | 5/1985 | Rabenau |
| 4,701,288 | A | | 10/1987 | Cook |
| 4,815,962 | A | * | 3/1989 | Cardone ....................... 427/525 |
| 5,114,628 | A | | 5/1992 | Hofer |
| 5,166,710 | A | | 11/1992 | Hofer |
| 5,200,121 | A | | 4/1993 | Hagmann |
| 5,396,045 | A | | 3/1995 | Opdyke |
| 5,452,031 | A | | 9/1995 | Ducharme |

(Continued)

FOREIGN PATENT DOCUMENTS

EP 322353 6/1989
EP 637491 A1 2/1995

(Continued)

OTHER PUBLICATIONS

Cabral, J.T., et al; Propagating waves of network formation induced by light, Polymer 46 (2005) pp. 4230-4241.

(Continued)

*Primary Examiner* — Yewebdar Tadesse

(57) ABSTRACT

This invention discloses apparatus for processing one or more of a Lens Precursor, a Lens Precursor Form and an ophthalmic Lens. The apparatus provides for vapor phase processing of the subject Lens Precursor, a Lens Precursor Form and an ophthalmic Lens.

1 Claim, 6 Drawing Sheets

(56) References Cited

U.S. PATENT DOCUMENTS

| | | | |
|---|---|---|---|
| 5,502,518 A | 3/1996 | Lieberman | |
| 5,517,260 A | 5/1996 | Glady | |
| 5,662,706 A | 9/1997 | Legerton | |
| 5,685,420 A | 11/1997 | Martin | |
| 5,983,201 A | 11/1999 | Fay | |
| 6,086,204 A | 7/2000 | Magnante | |
| 6,142,628 A | 11/2000 | Saigo | |
| 6,145,988 A | 11/2000 | Manfredini | |
| 6,233,102 B1 | 5/2001 | Hogan, Jr. | |
| 6,241,355 B1 | 6/2001 | Barsky | |
| 6,305,802 B1 | 10/2001 | Roffman | |
| 6,340,229 B1 | 1/2002 | Lieberman | |
| 6,413,251 B1 | 7/2002 | Williams | |
| 6,457,826 B1 | 10/2002 | Lett | |
| 6,471,891 B1 | 10/2002 | Cameron | |
| 6,499,843 B1 | 12/2002 | Cox | |
| 6,520,958 B1 | 2/2003 | Shimmick | |
| 6,595,639 B1 | 7/2003 | Ho | |
| 6,598,975 B2 | 7/2003 | Liang | |
| 6,616,275 B1 | 9/2003 | Dick | |
| 6,626,534 B1 | 9/2003 | DiMartino | |
| 6,881,269 B2 * | 4/2005 | Matsuzawa et al. | 118/719 |
| 6,935,743 B2 | 8/2005 | Shadduck | |
| 6,966,649 B2 | 11/2005 | Shadduck | |
| 7,029,119 B2 | 4/2006 | Youssefi | |
| 7,172,285 B1 | 2/2007 | Altmann | |
| 7,293,871 B2 | 11/2007 | Dreher | |
| 7,350,920 B2 | 4/2008 | Levine | |
| 7,384,146 B2 | 6/2008 | Covannon | |
| 2002/0024631 A1 | 2/2002 | Roffman | |
| 2002/0071094 A1 | 6/2002 | Roffman | |
| 2002/0071097 A1 | 6/2002 | Ross | |
| 2002/0140902 A1 | 10/2002 | Guirao | |
| 2002/0154271 A1 | 10/2002 | Donitzky | |
| 2003/0007123 A1 | 1/2003 | Broderick | |
| 2003/0053031 A1 | 3/2003 | Wirth | |
| 2003/0117580 A1 | 6/2003 | Franz | |
| 2003/0128336 A1 | 7/2003 | Jethmalani | |
| 2004/0015261 A1 | 1/2004 | Hofmann | |
| 2004/0046287 A1 | 3/2004 | Andino | |
| 2004/0046931 A1 | 3/2004 | Legerton | |
| 2004/0054358 A1 | 3/2004 | Cox | |
| 2004/0064376 A1 | 4/2004 | Yoshida | |
| 2004/0100619 A1 | 5/2004 | Olivier | |
| 2004/0119174 A1 | 6/2004 | Hofmann | |
| 2004/0169820 A1 | 9/2004 | Dai | |
| 2004/0169932 A1 | 9/2004 | Esch | |
| 2004/0179167 A1 | 9/2004 | Dahi | |
| 2004/0215525 A1 | 10/2004 | Keane | |
| 2004/0222539 A1 | 11/2004 | Hagmann | |
| 2004/0233382 A1 | 11/2004 | Lindacher | |
| 2004/0246440 A1 | 12/2004 | Andino | |
| 2004/0263779 A1 | 12/2004 | Schroder | |
| 2004/0263785 A1 | 12/2004 | Chernyak | |
| 2005/0041203 A1 | 2/2005 | Lindacher | |
| 2005/0060196 A1 | 3/2005 | Tsushi | |
| 2005/0068489 A1 | 3/2005 | Hall | |
| 2005/0073648 A1 | 4/2005 | Toshima | |
| 2005/0074616 A1 | 4/2005 | Harchanko | |
| 2005/0098478 A1 | 5/2005 | Gupta | |
| 2005/0099595 A1 | 5/2005 | Lindacher | |
| 2005/0105044 A1 | 5/2005 | Warden | |
| 2005/0105045 A1 | 5/2005 | Legerton | |
| 2005/0105048 A1 | 5/2005 | Warden | |
| 2005/0122472 A1 | 6/2005 | Fisher | |
| 2005/0131398 A1 | 6/2005 | Campbell | |
| 2005/0219461 A1 | 10/2005 | Hirohara | |
| 2005/0259221 A1 | 11/2005 | Marmo | |
| 2005/0264756 A1 | 12/2005 | Esch | |
| 2005/0275137 A1 | 12/2005 | Stolpe | |
| 2006/0001184 A1 | 1/2006 | Phelan | |
| 2006/0055071 A1 | 3/2006 | Kendig | |
| 2006/0055884 A1 | 3/2006 | Molinari | |
| 2006/0173644 A1 | 8/2006 | Dai | |
| 2006/0192310 A1 | 8/2006 | Lindacher | |
| 2006/0192919 A1 | 8/2006 | Lindacher | |
| 2006/0232743 A1 | 10/2006 | Legerton | |
| 2006/0256451 A1 | 11/2006 | Schaack | |
| 2006/0264917 A1 | 11/2006 | Tuan | |
| 2006/0268225 A1 | 11/2006 | Lieberman | |
| 2006/0279696 A1 | 12/2006 | Perez | |
| 2007/0023942 A1 | 2/2007 | Andino | |
| 2007/0038202 A1 | 2/2007 | Celestino | |
| 2007/0091259 A1 | 4/2007 | Svochak | |
| 2007/0097318 A1 | 5/2007 | Chehab | |
| 2007/0109497 A1 | 5/2007 | Chang | |
| 2007/0132949 A1 | 6/2007 | Phelan | |
| 2007/0273828 A1 | 11/2007 | Polland | |
| 2007/0274626 A1 | 11/2007 | Sabeta | |
| 2007/0284770 A1 | 12/2007 | Ansell | |
| 2008/0013043 A1 | 1/2008 | Ye | |
| 2008/0017977 A1 | 1/2008 | Tseng | |
| 2008/0055545 A1 | 3/2008 | Clamp | |
| 2008/0067702 A1 | 3/2008 | Yao | |
| 2008/0079184 A1 | 4/2008 | Yin | |
| 2008/0079895 A1 | 4/2008 | Jubin | |
| 2008/0137030 A1 | 6/2008 | Hoffman | |
| 2008/0143003 A1 | 6/2008 | Phelan | |
| 2008/0143004 A1 | 6/2008 | De Wilt | |
| 2008/0143960 A1 | 6/2008 | MacRae | |
| 2008/0143963 A1 | 6/2008 | Lindacher | |
| 2008/0165324 A1 | 7/2008 | Lindacher | |
| 2008/0179770 A1 | 7/2008 | Rooney | |
| 2008/0192201 A1 | 8/2008 | Wengler | |
| 2008/0277811 A1 | 11/2008 | Miller | |
| 2008/0288369 A1 | 11/2008 | Hunter | |
| 2008/0291395 A1 | 11/2008 | Dai | |
| 2008/0306573 A1 | 12/2008 | Campin | |
| 2008/0309873 A1 | 12/2008 | Levecq | |
| 2009/0022274 A1 | 1/2009 | Gertner | |
| 2009/0033920 A1 | 2/2009 | Simpson | |
| 2009/0051059 A1 | 2/2009 | Widman | |
| 2009/0053351 A1 | 2/2009 | Widman | |

FOREIGN PATENT DOCUMENTS

| | | |
|---|---|---|
| EP | 496544 B1 | 9/1996 |
| EP | 637491 B1 | 11/1997 |
| EP | 1750162 A2 | 2/2007 |
| EP | 1552336 B1 | 10/2008 |
| JP | 2001290978 A | 10/2001 |
| JP | 2002078681 A | 3/2002 |
| JP | 2002357796 A | 12/2002 |
| JP | 2003295134 A | 10/2003 |
| WO | WO 9729441 A1 | 8/1997 |
| WO | WO 9842497 A2 | 10/1998 |
| WO | WO 9842497 A3 | 10/1998 |
| WO | WO 0102881 | 1/2001 |
| WO | WO 0233628 A2 | 4/2002 |
| WO | WO 03013832 | 2/2003 |
| WO | WO 03037716 A2 | 5/2003 |
| WO | WO 2004039554 A2 | 5/2004 |
| WO | WO 2005005121 A2 | 1/2005 |
| WO | WO 2005005121 A3 | 1/2005 |
| WO | WO 2005007386 A2 | 1/2005 |
| WO | WO 2005007386 A3 | 1/2005 |
| WO | WO 2005098478 A1 | 10/2005 |
| WO | WO 2006010632 A1 | 2/2006 |

OTHER PUBLICATIONS

PCT International Search Report, dated May 26, 2011, for PCT Int'l Appln. No. PCT/US2001/027961.

* cited by examiner

APPARATUS FOR VAPOR PHASE PROCESSING OPHTHALMIC DEVICES

FIELD OF USE

This invention describes apparatus relating to the fabrication of ophthalmic devices and, more specifically, in some embodiments, apparatus for vapor phase processing of one or more of: a Lens Precursor useful for the formation of a customized ophthalmic lens, an ophthalmic Lens Precursor Form and an ophthalmic Lens.

BACKGROUND OF THE INVENTION

Ophthalmic lenses are often made by cast molding, in which a monomer material is deposited in a cavity defined between optical surfaces of opposing mold parts. Multi-part molds used to fashion hydrogels into a useful article, such as an ophthalmic lens, can include for example, a first mold part with a convex portion that corresponds with a back curve of an ophthalmic lens and a second mold part with a concave portion that corresponds with a front curve of the ophthalmic lens. To prepare a lens using such mold parts, an uncured hydrogel lens formulation is placed between a plastic disposable front curve mold part and a plastic disposable back curve mold part.

The front curve mold part and the back curve mold part are typically formed via injection molding techniques wherein melted plastic is forced into highly machined steel tooling with at least one surface of optical quality.

The front curve and back curve mold parts are brought together to shape the lens according to desired lens parameters. The lens formulation was subsequently cured, for example by exposure to heat and light, thereby forming a lens. Following cure, the mold parts are separated and the lens is removed from the mold parts.

Cast molding of ophthalmic lenses has been particularly successful for high volume runs of a limited number of lens sizes and powers. However, the nature of the injection molding processes and equipment make it difficult to form custom lenses specific to a particular patient's eye or a particular application. Consequently, other techniques have been explored, such as: lathing a lens button and stereo lithography techniques. However, lathing requires a high modulus lens material is time consuming and limited in the scope of the surface available and stereo lithography has not yielded a lens suitable for human use.

In prior descriptions, methods and apparatus for forming customized lenses via the use of voxel based lithographic techniques have been described. An important aspect of these techniques is that a lens is produced in a novel manner where one of two lens surfaces is formed in a free form fashion without cast molding, lathing or other tooling. A free formed surface and base may include a free flowing fluent media included in the free formed surface. This combination results in a device sometimes referred to as a Lens Precursor. According to the present invention a Lens Precursor including a free surface and fluent media are exposed to processing steps prior to exposure to fixing radiation and hydration treatments typically utilized to convert a Lens Precursor into an ophthalmic lens.

It is desirable therefore to utilize the accessibility to the free form surface and media thereupon to treat the Lens Precursor in additional means via treatment with chemical species in the gas phase around the precursor surface. Additional methods may derive from similar treatment of the free formed surface of an ophthalmic lens formed after exposing a Lens Precursor to fixing methodology

SUMMARY OF THE INVENTION

The present invention is directed to the methods for treating ophthalmic Lens Precursors in the vapor phase, wherein, in some embodiments, the treated Lens Precursor can subsequently be utilized to form an ophthalmic lens. Generally, according to the present invention, a Lens Precursor is formed via a polymerization process and either subsequently or coincidentally located in an apparatus that allows for the control of a gaseous environment surrounding the formed Lens Precursor. Various embodiments of the present invention control this gaseous environment surrounding the Lens Precursor to a vapor phase with different constituents, wherein, at least one of the constituents affects a physical property of the Lens Precursor or a lens formed from the Lens Precursor.

Additional methods include vapor phase treatment performed upon a lens that is disposed upon a mandrel or forming optic.

DETAILED DESCRIPTION OF THE INVENTION

Figure 1:
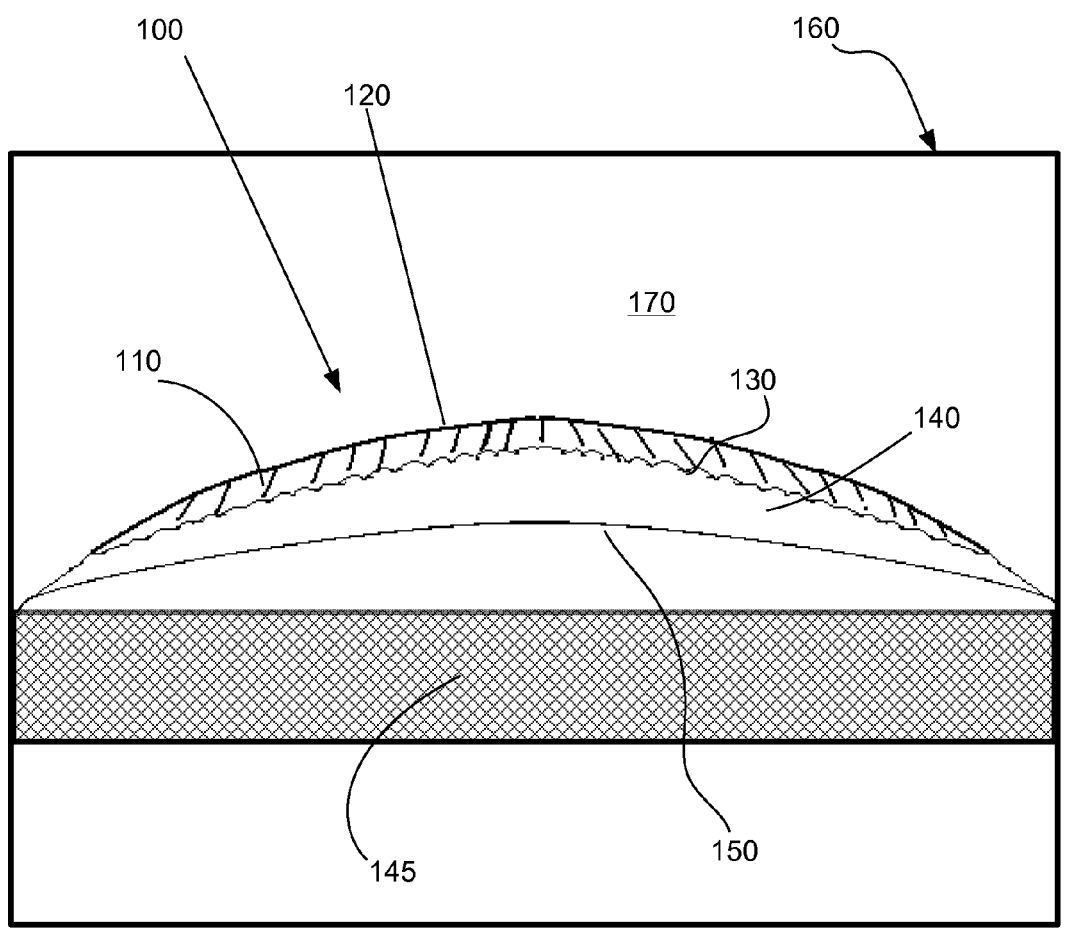
FIG. 1 illustrates a depiction of a Lens Precursor within a vapor phase chamber.

The present invention provides for apparatus and methods of treating one or both of a lens and a Lens Precursor with vapor phase processing. In the following sections detailed descriptions of embodiments of the invention will be given. The description of both preferred and alternative embodiments though thorough are exemplary embodiments only, and it is understood that to those skilled in the art that variations, modifications and alterations may be apparent.

GLOSSARY

In this description and claims directed to the presented invention, various terms may be used for which the following definitions will apply:

"Actinic Radiation" as used herein, refers to radiation that is capable of initiating a chemical reaction, such as, for example, polymerization of a Reactive Mixture.

"Arcuate" as used herein, refers to a curve or bend like a bow.

"Beer's Law" as referred to herein and sometimes referred to as "Beers-Lambert Law" is: $I(x)/I0 = \exp(-\alpha c x)$, wherein $I(x)$ is the intensity as a function of distance x from the irradiated surface, $I0$ is the incident intensity at the surface, $\alpha$ is the absorption coefficient of the absorbing component, and c is the concentration of the absorbing component.

"Collimate" as used herein means to limit the cone angle of radiation, such as light radiation that proceeds as output from an apparatus receiving radiation as an input; in some embodiments the cone angle may be limited such that proceeding light rays are parallel. Accordingly, a "collimator" includes an apparatus that performs this function and "collimated" describes the effect on radiation.

"DMD" as used herein, a digital micromirror device is a bistable spatial light modulator consisting of an array of movable micromirrors functionally mounted over a CMOS SRAM. Each mirror is independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors then is passed through a projection lens and onto a screen. Light is reflected off to create a dark field, and defines the black-level floor for the image. Images are created by gray-scale modulation between on and off levels at a rate fast enough to be integrated by the observer. The DMD (digital micromirror device) is sometimes DLP projection systems.

"DMD Script" as used herein shall refer to a control protocol for a spatial light modulator and also to the control signals of any system component, such as, for example, a light source or filter wheel either of which may include a series of command sequences in time. Use of the acronym DMD is not meant to limit the use of this term to any one particular type or size of spatial light modulator.

"Fixing Radiation" as used herein, refers to Actinic Radiation sufficient to one or more of: polymerize and crosslink, essentially all Reactive Mixture comprising a Lens Precursor or lens.

"Fluent Lens Reactive Media" as used herein means a Reactive Mixture that is flowable in either its native form, reacted form, or partially reacted form and, a portion or all Reactive Media may be formed upon further processing into a part of an ophthalmic lens.

"Free-form" as used herein "free-formed" or "free-form" refers to a surface that is formed by crosslinking of a Reactive Mixture and is not shaped according to a cast mold, lathe, or laser ablation.

"Gel Point" as used herein shall refer to the point at which a gel or insoluble fraction is first observed. Gel point is the extent of conversion at which a liquid polymerization mixture becomes a solid.

"Lens" as used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein, means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from a volume of Reactive Mixture used to produce the Lens Precursor Form can generate a Lens Precursor. Additionally, a Lens Precursor can be converted to a different entity by either the removal of significant amounts of Fluent Lens Reactive Mixture or the conversion of a significant amount of Fluent Lens Reactive Media into non-fluent, incorporated material.

"Lens Precursor Form" as used herein, means a non-fluent object with at least one optical quality surface which is consistent with being incorporated, upon further processing, into an ophthalmic lens.

"Lens Forming Mixture" as used herein, the term or "Reactive Mixture" or "RMM" (reactive monomer mixture) refers to a monomer or prepolymer material which can be crosslinked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

"Mold" as used herein, refers to a rigid or semi-rigid object that may be used to form lenses from uncured formulations. Some preferred molds include two mold parts forming a front curve mold part and a back curve mold part.

"Radiation Absorbing Component" as used herein, the term "refers to radiation-absorbing component which can be combined in a reactive monomer mix formulation and which can absorb radiation in a specific wavelength range.

Reactive Mixture (also sometimes referred to herein as: Lens Forming Mixture or Reactive Monomer Mixture and with same meaning as "Lens Forming Mixture").

"Release from a mold" as used herein, "release from a mold," means that a lens becomes either completely separated from the mold, or is only loosely attached so that it can be removed with mild agitation or pushed off with a swab.

"Stereolithographic Lens Precursor" as used herein means a Lens Precursor where the Lens Precursor Form has been formed by use of a stereolithographic technique.

"Substrate" A physical entity upon which other entities are placed or formed.

"Transient Lens Reactive Media" as used herein means a Reactive Mixture that remains on a Lens Precursor Form and is not fully polymerized and may remain in fluent or non-fluent form. Transient Lens Reactive Media is significantly removed by one or more of: cleaning, solvating and hydration steps before it becomes incorporated into an ophthalmic lens. Therefore, for clarity, the combination of a Lens Precursor Form and the transient lens Reactive Mixture does not constitute a Lens Precursor.

"Voxel" as used herein "Voxel" or "Actinic Radiation Voxel" is a volume element, representing a value on a regular grid in three dimensional space. A Voxel can be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture, thereby controlling the rate of crosslinking or polymerization of that specific volume of Reactive Mixture. By way of example, Voxels are considered in the present invention as existing in a single layer conformal to a 2-D mold surface wherein the Actinic Radiation may be directed normal to the 2-D surface and in a common axial dimension of each Voxel. As an example, specific volume of Reactive Mixture may be crosslinked or polymerized according to 768× 768 Voxels.

"Voxel-based Lens Precursor" as used herein "Voxel-based Lens Precursor" means a Lens Precursor where the Lens Precursor Form has been formed by use of a Voxel-based lithographic technique.

"Xgel" as used herein, Xgel is the extent of chemical conversion of a crosslinkable Reactive Mixture at which the gel fraction becomes greater than zero.

"Mandrel" as used herein, includes an article with a shaped surface for securing an ophthalmic lens.

Methods

The inventive art herein concerns treating one or both of an ophthalmic lens and an ophthalmic Lens Precursor with vapor phase processing. Generally, one or both of the ophthalmic Lens Precursor and the ophthalmic lens are formed via a voxel lithographic based technique.

Referring to FIG. 1, a generic form of a Lens Precursor 100 is illustrated. A Lens Precursor Form 140 with a first and second generally arcuate surface and the first generally arcuate surface 150 defined by the surface of a mandrel 145 upon which the base is formed. A second generally arcuate surface 130 formed via a voxel lithographic technique. The Lens Precursor Form 140 may be comprised of polymers formed as the polymers passed their Gel Point, wherein the lens form has not yet been exposed to fixing radiation.

In some embodiments, Gel Point can be determined using soxhlet equipment. A polymer reaction can be stopped at different time points and a resulting polymer is analyzed to determine a weight fraction of residual insoluble polymer. Resulting data can be extrapolated to a point where no gel is present. This point where no gel is present is the Gel Point.

In other embodiments, a gel point may also be determined by analyzing a viscosity of a reaction mixture during a reaction. The viscosity can be measured, for example, using a parallel plate rheometer, with reaction mixture between the plates. At least one plate should be transparent to radiation at the wavelength used for polymerization. The point at which the viscosity approaches infinity is the gel point. Gel point may occur at a same degree of conversion for a given polymer system and specified reaction conditions.

Continuing with FIG. 1, this type of Lens Precursor 100 includes an internal boundary 130 between the form 140, wherein a gel point has been reached, and fluent media 110, wherein the gel point has not been reached.

Processing of the Lens Precursor Form 140 and fluent media 110 may generate an optical quality surface 120. Processing may include for example exposure of the Lens Precursor Form 140 to actinic radiation. Numerous polymer systems may be used to form entity 100 in a voxel lithographic manner, and still further it may be apparent that other techniques may define a Lens Precursor 100 which includes a Lens Precursor Form 140 upon which a fluent media 110 is deployed.

The exemplary voxel lithographic Lens Precursor 100 is a combination of different regions 110, 120, 130, 140, as described above. Each of these regions 110, 120, 130, 140, may include a combination of different chemical moieties. For example, each region may include one or more of: polymeric entities, multimeric entities, monomer, solvent and desolved chemicals to mention a few.

A Lens Precursor 100 has not been subjected to fixing radiation, therefore, in some embodiments, significant levels of interdiffusion of various materials will occur. Some of the various materials will access the surface 120 and, which may in some embodiments be in physical contact with a vapor phase 170 beyond the surface 120 is boundary.

The present invention addresses method and apparatus to control interaction between the vapor phase 170 and the surface of the Lens Precursor 120.

In some embodiments of the present invention, a vapor phase 170 proximate to a precursor surface 120 is controlled via an enclosure 160 around the Lens Precursor 100. Some embodiments may also include enclosing a substrate 145 supporting a Lens Precursor.

Figure 2:
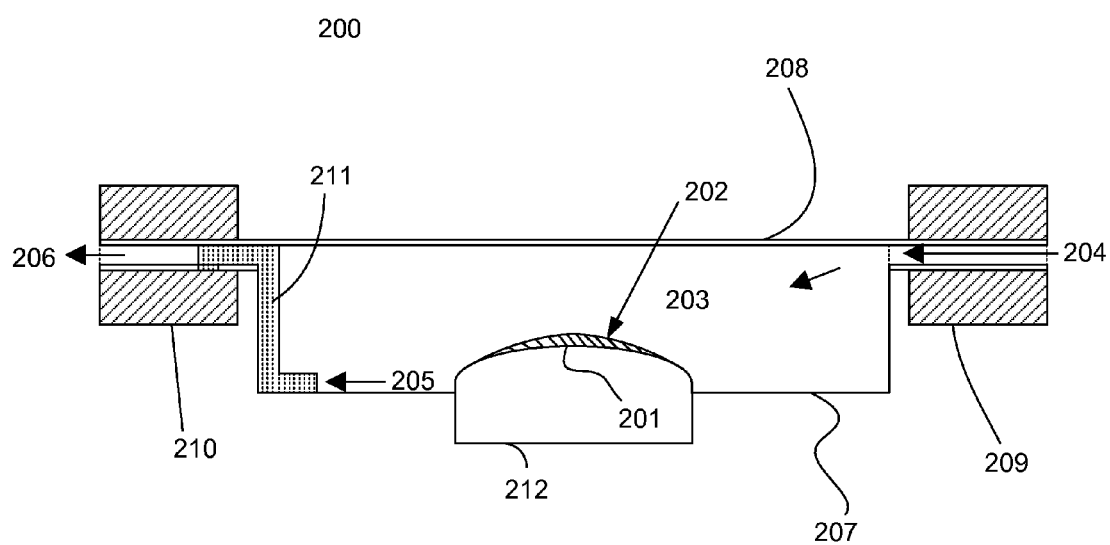
FIG. 2 illustrates additionally exemplary processing environments described that facilitate control of vapor phase processing of Lens Precursors and lenses.

Referring now to FIG. 2, a Lens Precursor 201 is illustrated which is formed by voxel lithographic processing techniques. The Lens Precursor 201 is located upon an arcuate optical forming surface 212. A Volume of Reactive monomer mixture in which the Lens Precursor was formed has been drained from the enclosure.

Following draining, an environment proximate to the Lens Precursor includes a vapor phase 203. In some embodiments, the vapor phase 203 is contained by walls, 201-208 included in the processing apparatus 200. Flow 204-206 of a liquid or gas through vapor phase 203 may be used to introduce desired attributes into the vapor phase. The apparatus may have interfacing fixtures including an inlet 209 and an outlet 210, that allow an external controlling environment to establish vapor flow or in some embodiments establish a static vapor phase condition, or alternatively evacuate the vapor phase 203 in part or essentially entirely.

In some embodiments, mechanical fixtures allow evacuation of vapor phases. In some particular embodiments, a tube 211 or any other device providing fluid communication between an interior of the chamber 203 and an exterior of the chamber 206 may define an exit port for evacuation. For example, in some embodiments different flow patterns 204-206 may be established through the use of evacuation tubes 211, wherein tubes 211 may be located in different manners and locations within the apparatus and essentially allow for removal of some or all of a vapor phase 203 from an area proximate to the lens precursor 201 and specifically removal of some or all of a vapor phase 203 from an atmosphere proximate to a surface 202 exposed to the vapor phase 203.

In some embodiments, tube 211 location or the location of another device providing fluid communication, allows for a flow of vapor phase 203 to be directed proximate to the lens surface 202. Other embodiments include a Lens Precursor 201 with an apex generally orthogonal to a gravitational direction, and a tube with an opening for vacating one or both of: a gas and a liquid, below a plane of the apex, such the one or both of the gas and liquid are down past the Lens Precursor.

Numerous controlling features may allow control of a Vapor Phase interaction with a Lens or Lens Precursor 201 in an environment. Features may include, by way of non-limiting example, one or more of: shaped tubes 211, gas injectors, gas distributors, valves, mass flow controllers, pressure regulators, vacuum systems, gas mixing systems and other such apparatus not illustrated.

For example, in some embodiments, treatment of a Lens Precursor 201 may involve flowing gas into and out of an area defined by containment barriers 207-208 via an inlet 209 and an outlet 210. Some specific embodiments may include flow of an inert gas including one or more of: Argon and Nitrogen. The flow of gas can be controlled, for example, by a mass flow controller to regulate a specific quantity of a gas included in the vapor phase 203 to pass over the Lens Precursor 201. In some embodiments, such an inert gas flow 204-206 may be used to facilitate limiting exposure of a lens precursor 201 to particular gasses otherwise present in a typical ambient. In other embodiments, an inert gas flow 204-206 allows the desiccating of the Lens Precursor 201 from constituents that have an appreciable vapor pressure and outgas from the Lens Precursor 201 in such an environment. As a non limiting example, solvent present in a Reactive Monomer Mixture used to form the Lens Precursor 201 may be removed from the Lens Precursor 201 into the vapor phase 203 and exited through outlet 210.

Still further embodiments of flowing an inert ambient may relate to desiccating or removal by outgassing of materials that are present from the environment of the Lens Precursor 201 as opposed to one or more of the Lens Form and fluent Lens Reactive Media itself. It may be clear to one skilled in the arts that there could be a variety of processing options that would derive by flowing an inert gas through an apparatus capable of isolating the Lens Precursor environment.

Other embodiments may include the introduction of a liquid through an inlet 204, wherein the liquid interacts with the vapor phase 203 and thereby imparts characteristics into the vapor phase 203 that are useful for treating the surface 202 of the lens precursor 201.

Additional and related embodiments include a mandrel 212 supporting an entity that has already been exposed to fixing irradiation and therefore constitutes a Lens rather than a Lens Precursor 201. In still further embodiments, a lens formed by exposing said voxel lithographic Lens Precursor 201 to fixing radiation may subsequently be converted to a Lens Precursor 201 by the addition of fluent Lens Reactive Media to a surface of the Lens. Again, the environment of such a Lens Precursor 201 may include processing embodiments where the Lens Precursor 201 is processed with an inert vapor phase 203. It may be apparent to one skilled in the arts that a broad array of similar embodiments may derive from processing numerous types of Lens Precursors 201 including, without limitation, Lens Precursors 201 where a Lens Form is made using stereo lithographic techniques, lathing techniques, or cast molding techniques.

Figure 3:
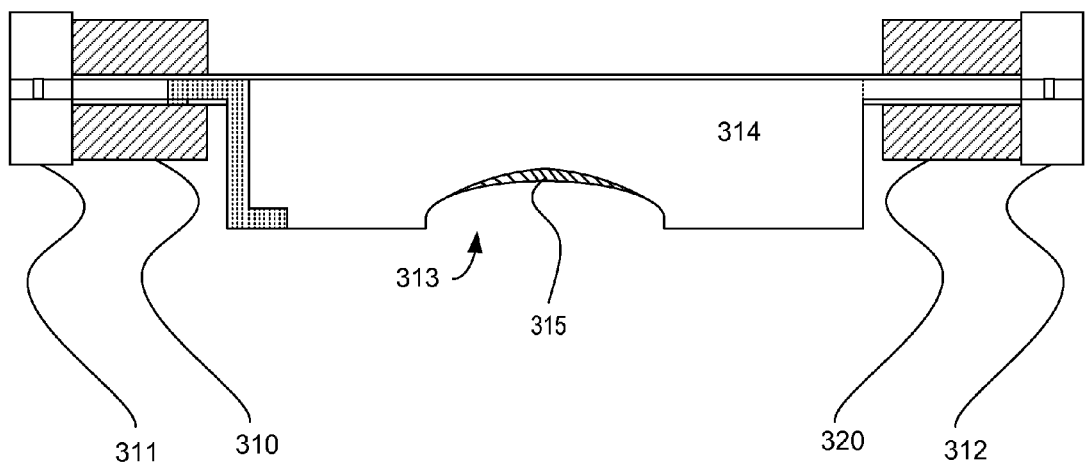
FIG. 3 illustrates a vapor phase chamber apparatus with control valves.

Referring now to FIG. 3, in some alternative embodiments, an apparatus 300 that processes one or more of: a Lens Precursors, Lens Precursor Form and a Lens, includes valves 311-312 connected to an inlet port 310 and an outlet port 320. In some exemplary embodiments, an inlet port valve 310 and outlet port valve 320 are capable of being closed to effectively isolate atmosphere within a chamber 314 wherein the chamber 314 contains a Lens Precursor 315 formed via voxel by voxel polymerization or a mandrel 313 or other substrate.

In some embodiments, the apparatus maintains a static ambient atmosphere or Vapor Phase 314 above the Lens Precursor 315. In other controlled, varied atmospheres, it may be apparent to one skilled in the arts, that such an isolation may limit the amount of a particular species present in the vapor ambient to comprise only that present when the apparatus was set into an isolating state.

Further embodiments may derive from processing a Lens Precursor 315 in a similar manner where the ambient is isolated by the apparatus to maintain a static vapor phase over the Lens Precursor 315. In this embodiment type, the Lens Precursor 315 itself may contain species that are volatile and outgas from the Lens Precursor 315 into the static vapor phase. In some embodiments this material may be present in the fluent lens reactive media itself and it may diffuse through the top surface 120 and into the vapor phase. Volatile species may initially be found in a lens form and diffuse into the fluent lens reactive media. In some cases the outgassing process may add a constituent into the ambient vapor phase 314 that reaches a vapor pressure of the constituent and thereafter maintains an equilibrium concentration above the Lens Precursor 315 surface. In different embodiments, the outgassing may not reach such an equilibrium condition and may increase the constituent's partial pressure in the vapor phase over time.

A static vapor phase over a Lens Precursor 315 may also result in embodiments, where a vapor phase 311 becomes enriched in chemical moieties that are resulting byproducts of chemical reactions that occur in the parts of the Lens Precursor 315 itself. In alternative embodiments of this type, the reactions that generate the byproducts may themselves be activated by action upon the Lens Precursor 315 while it is in the environment of the vapor phase processing apparatus 300. Without limitation, in some embodiments this externally activated type of process may be activated for example by one or both of thermal processing of the Lens Precursor 315, by light activated processing by radiation other than light.

Embodiments may also include a liquid or gas introduced into the chamber 314 via the controllable valve 311-312. Various embodiments may include introduction of an inert gas, wherein other embodiments include introduction of a gas including a catalyst for a reaction on or within the Lens Precursor 315. In some particular embodiments, a monomer may be introduced via the valve, wherein the monomer may be equivalent to a monomer used to form the Lens Precursor 315 or a different monomer which may be controllably polymerized, such as for example, via a voxel by voxel polymerization, to enhance the Lens Precursor 315.

Figure 4:
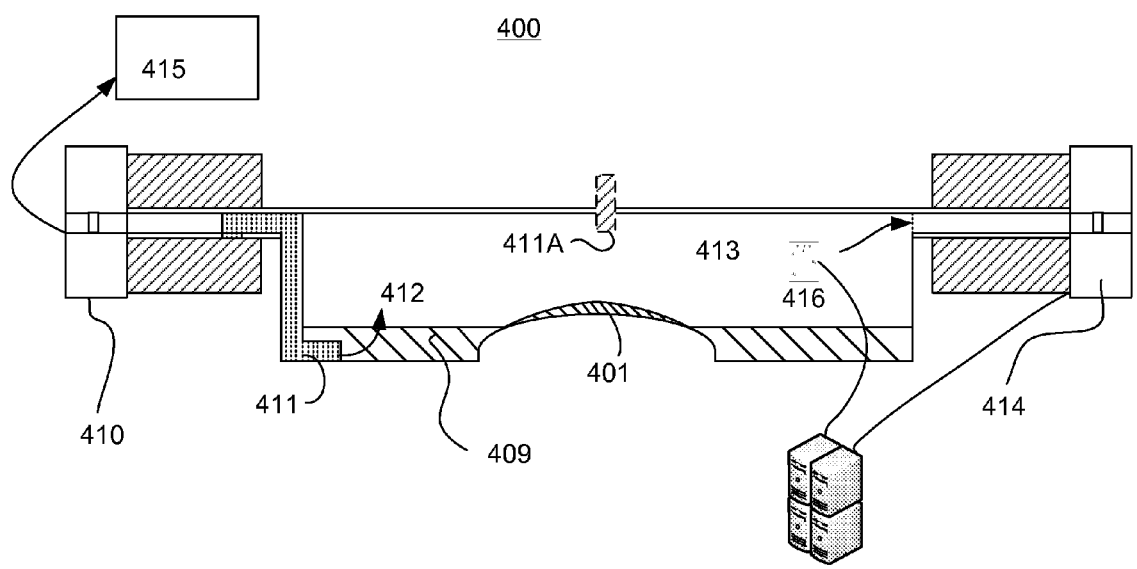
FIG. 4 illustrates a vapor phase chamber and a controller.

Referring now to FIG. 4, still further embodiments of static phase vapor processing may derive when the isolated environment may include a liquid phase of a chemical constituent. A liquid phase constituent 409 may include, for example, a monomeric form from the reactive monomer mixture, or alternatively a solvent present in the reactive monomer mixture. Various embodiments may derive by including a liquid phase constituent 409 into an environment wherein the vapor phase 413 is isolated and becomes populated by gaseous forms of the molecules that comprise the liquid phase 409.

Embodiments may also include reaction apparatus 400 with an inlet valve 410 introducing a gas 412 via an outlet 411 into a liquid phase constituent 409. In some embodiments (as illustrated), the outlet 411 provides liquid communication between an area exterior to the chamber 415 and an area interior to the chamber 413. Additionally, it may be advantageous to position a location of the outlet relative to the one or more of: Lens Precursor 401, Lens Precursor Form and Lens. For example, in some embodiments (as illustrated) the outlet 411 may be located at a point below an apex of the Lens Precursor 401. Other embodiments may include an inlet 411A that is above an apex of the Lens Precursor 401.

As the gas 412 passes over, bubbles through, or otherwise interacts with a liquid phase constituent 409, the gas may extract gaseous forms of molecules that comprise the liquid phase constituent 409 and bring the molecules into the vapor phase environment 413 proximate to the Lens Precursor 401. Variables which may affect such embodiments may include one or more of: varying a rate of flow of gas, varying a type of gas, temperature of gas, combinations of gas, order of introduction of gas.

In various embodiments, vapor phase chemicals may interact with one or both of a Lens Precursor and Lens Precursor Form. Details of such interactions may create different embodiments in their own right.

In a first example, constituents in a vapor phase are capable of one or both of physisorbing or chemisorbing upon the surface of the Lens Precursor 401. A constituent is adsorbed, or otherwise interacts with a Lens Precursor surface; it may react with that surface and result in a chemically modified surface region.

In some embodiments, adsorbed material may not react initially but rather may diffuse within the fluent Lens Reactive Media and possibly into the Lens Form as well. When this vapor phase constituent thus adsorbs and diffuses into the bulk, subsequent processing may be enacted to change a characteristic of the Lens Precursor or Lens Form the vapor phase constituent is adsorbed into.

In some embodiments, a Vapor Phase constituent 409 includes a Reactive Monomer which interacts with a surface of a Lens Precursor 401 or Lens. Subsequent processing by fixing radiation, polymerizes the Reactive Monomer present on the surface of a Lens Form, Lens Precursor 401 or Lens and result in a change of the physical or chemical properties of the a Lens, Lens Precursor 401 or Lens Form. An abundant variety of chemical compounds and mixtures may be utilized thereby enabling a large variety of embodiments within the scope of this invention.

Another way this art of exposing the Lens Precursor 401 to material which adsorbs or chemisorbs to modify the Lens Precursor 401 is based on whether a chemical compound or chemical mixture which is exposed in the vapor phase to the Lens Precursor 401 is already a constituent of the Lens Precursor 401. In some embodiments, a vapor phase constituent may include a monomer already present in a Reactive Mixture such as an Etafilcon A reactive monomer mixture. The Etafilcon A can be used to form a Lens Precursor 401 using a voxel based lithographic process. The incorporation of Etafilcon A monomer into the Lens Precursor 401 may result in a different level of this monomer at different positions in the Lens Precursor 401.

Alternatively, another embodiment type results when a vapor phase chemical that is a new chemical species to the Lens Precursor 401 is exposed to a Lens Precursor 401. The new chemical species may directly cause, act as a catalyst, or otherwise facilitate change in properties of various locations within the Lens Precursor 401.

Still further embodiments include a Lens Precursor 401 exposed to a vapor phase constituent which is also a constituent of the Lens Precursor 401. If a vapor phase is made to be controllably static in the environment of the Lens Precursor 401, then volatile species found in the Lens Precursor 401 may desorb from the Lens Precursor into the vapor phase. As the desorption occurs the partial pressure of the desorbing species will increase until or unless it is at the point where equilibrium occurs between the vapor and the surface of the Lens Precursor 401. In some embodiments therefore, the static environment where equilibrium has been reached may allow the concentrations within the Lens Precursor of a volatile species to come to equilibrium. Since the physical and chemical properties, for example ability to be hydrated, are a function of the compositional makeup of both lenses and Lens Precursors 401, this static vapor phase treatment protocol may result in defined properties of a lens made in this manner.

In some alternative embodiments the vapor phase constituents may react upon interaction with a particular portion of a Lens Precursor 401 or lens. In some embodiments, the vapor phase constituent may react upon the top surface of the Lens Precursor 401, fluent reactive media. In other embodiments, the constituent may first diffuse into the fluent lens reactive media before reacting or alternatively through the fluent media and into the lens form before reacting. It may be apparent to one skilled in the art that each of these embodiment types could result in different physical and or chemical properties of a lens formulated with these vapor phase processing innovations.

In another aspect of the present invention, in some embodiments, a sensor, such as for example, a sensor generating an analog or digital signal based upon a condition within the chamber 413, may be located within or proximate to the chamber 413 and generate a signal based upon a condition within the chamber 413. A logical controller, such as, for example a computer server, a workstation, a microprocessor, micro-controller or other device able to execute logical instructions may be in logical communication with one or more of the sensor 416, the valves 410,414 or other controllable feature. The logical controller may receive data, issue command and store data useful to operation of the apparatus.

Figure 5:
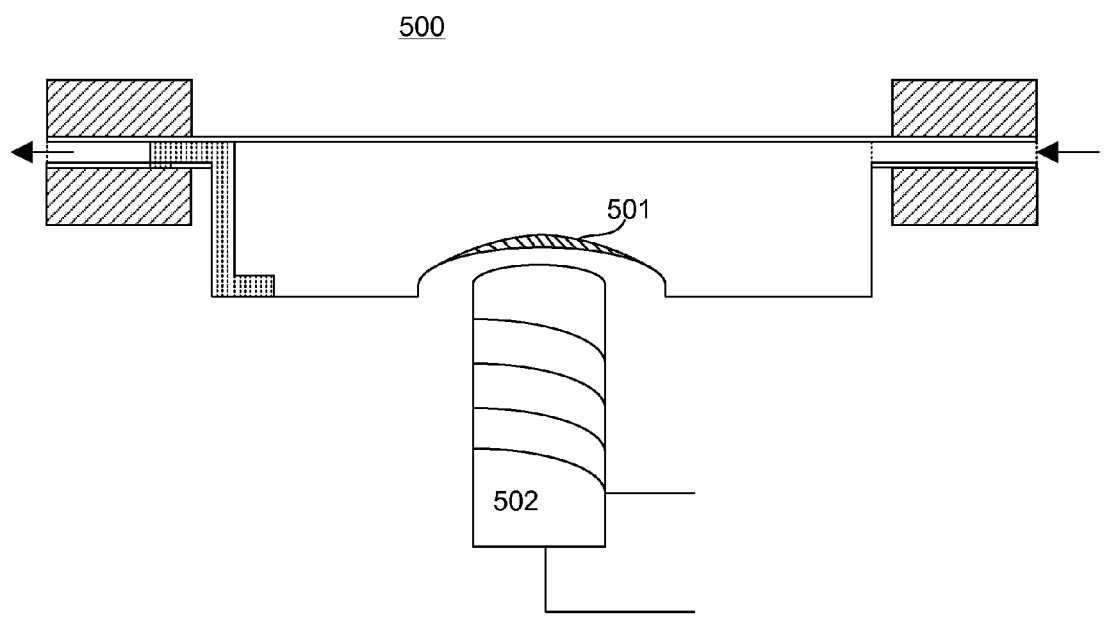
FIG. 5 illustrates a vapor phase chamber including a thermal control device.

Referring now to FIG. 5, in addition to the vapor phase processing environment and the diverse embodiments that have been described relating to vapor phase processing, it can be supplemented by addition of ability to heat a Lens Precursor environment. A thermal energy control device 502, for example a heat source or a chilling device, is placed proximate to a vapor phase treatment apparatus 500 may be used to increase thermal energy in one or both of a Lens Precursor 501 and a vapor phase environment. Alternative manners of heating the environment may include heating the vapor phase itself that is being fed into the treatment apparatus. In fact, there may be numerous manners of treating the lens or Lens Precursor 501 environment with external thermal processing.

A thermal control device 502 which includes a heating apparatus may include one or more of a resistance coil, a heat exchange unit and a thermo electric Peltier device. Thermal processing may be useful for numerous changes to the nature of the Lens Precursor or lens. By way of a non-limiting example, volatile components within one or more of the lens, lens form or fluent lens reactive media may be made more volatile by heating of an environment in which one or more of a Lens Form, Lens Precursor 501 and Lens are present. In some embodiments therefore, it is possible to effectively remove volatile components from the various Lens, Lens Precursors and Lens Precursor Forms via the application of heat.

Thermal processing may also be utilized to enact reaction processes to occur at a higher rate. In another non limiting example, cross linking may be accelerated by the presence of thermal heating. Vapor phase may be used to transport a monomeric compound into a Lens, Lens Precursor 501 or Lens Form and by thermal treatment it may be made to react within the Lens, Lens Precursor 501 or Lens Form.

Still further embodiments include a thermal energy control device 502 which includes a cooling device, such as for example, a chiller, a thermoelectric cooler, chilled water supply, or other apparatus capable of decreasing an amount of thermal energy available within a vapor phase environment and thereby decreases the amount of thermal energy available to one or more of a Lens Precursor Form, Lens Precursor 501, and ophthalmic Lens. Decreased thermal energy may be used to slow some chemical reactions manifested in the one or more of a Lens Precursor Form, Lens Precursor 501, and ophthalmic Lens.

Figure 6:
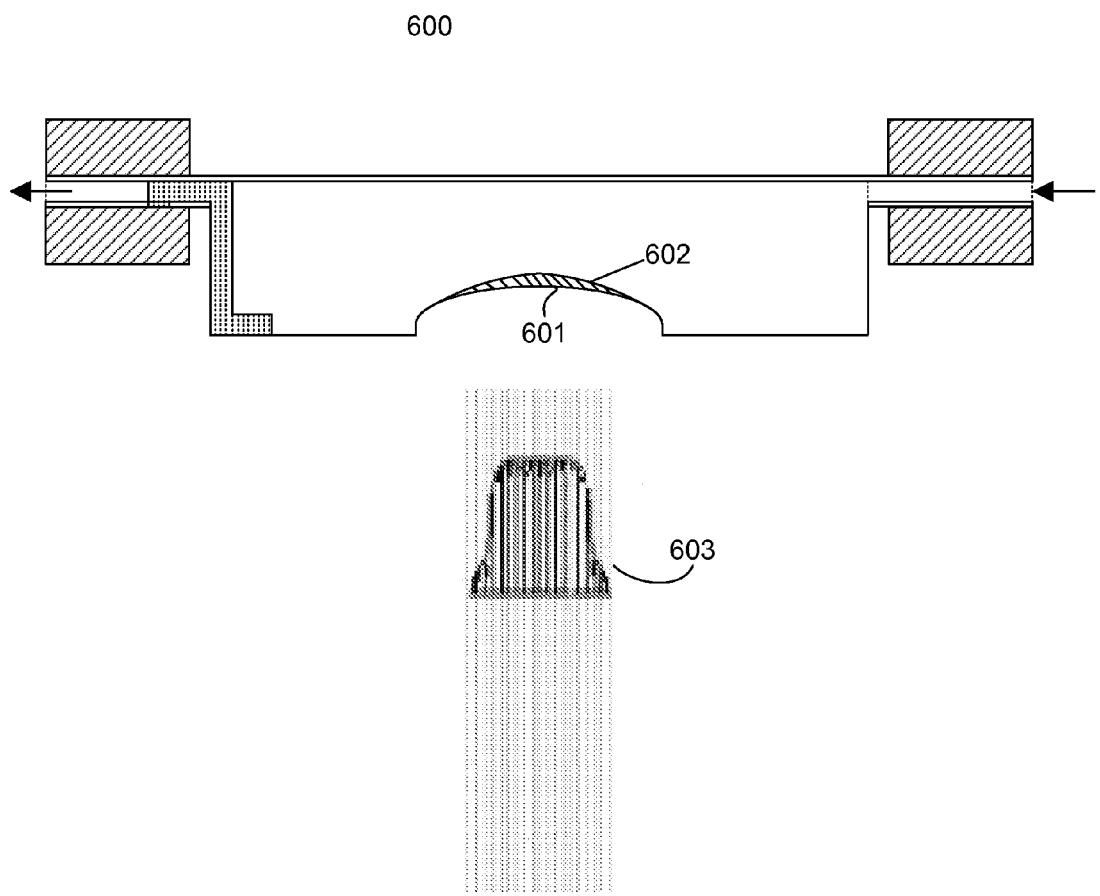
FIG. 6 illustrates a vapor phase chamber including a radiation source.

Referring now to FIG. 6, in another aspect of the present invention, apparatus for providing vapor phase processing 600 may also include a radiation source capable of emanating light radiation for photoprocessing one or more of: a Lens Precursor 601; a Lens Precursor Form and a Lens. In some embodiments, photoprocessing is controlled via a same voxel lithographic processing light system that was used to form a Lens Precursor 601, Lens Precursor Form, Lens or other lens object.

In some embodiments, a light source 602 may control exposure of a photoreactive chemical on the surface 603 of one or more of: a Lens Precursor 601, Lens Precursor Form, Lens or other lens object. The exposed photoreactive chemical may physisorb onto the surface 603 where it they may interact with photon exposure and in so interact be chemically modified and incorporated onto the surface. Numerous types or photo based reactions may be included in embodiments within the scope of this invention and without loss of generality may include regional treatment of the Lens Precursor 601 or lens object by voxel lithographic treatment, masked lithography treatment or more generally unmasked photon exposure to the entire Lens Precursor 601 or lens object.

It may be apparent that the numerous examples of methods of treating a lens object or a Lens Precursor 601 in an environment where the vapor phase surrounding is controlled with an apparatus have been described in relatively simple single processing steps or combinations of steps. However, it should also be clear that these various processing steps may as well be combined into more sophisticated treatment processes. In a non limiting sense these combinations may be combinations of processing techniques that occur in a sequential manner. Alternatively, a number of processing techniques may be activated in a parallel mode.

As a result of the processing embodiments that have been described in relation to this inventive art, there are numerous changes that may be caused to occur in both Lens Precursors 601 and lens objects that are produced. These resulting products may themselves define new device embodiments of the voxel lithographic technique. Without limitation the nature of changes to the lens objects and Lens Precursors 601 may include chemical changes to the surface and bulk material properties of the Lens Precursor or the lens object. In other device embodiments, vapor phase treatment may result in changes to material stress aspects, the density of portions of the lens object and Lens Precursors 601 and from a more global perspective the shape that these devices will assume in their final form. Still other devices may derive from changes to the surface composition of the lens objects and Lens Precursors which may result in changes to the wettability of the surface. Further device diversity may result from changes in color, incorporation of dies or changes of absorbance of regions of the Lens Precursor 601 or lens object. Other changes that may be processed into the lens objects and Lens Precursors 601 may also include changes to the permeability of the bulk materials that make up the devices. In other embodiments of the altered devices changes through vapor phase processing may include alteration of the thermal stability of the devices. The processing techniques also may enable lens objects that contain chemicals or pharmaceutical compounds to be incorporated through vapor phase processing. It may be apparent to one skilled in the art, that these device embodiments are mentioned as examples of what may be possible and are not meant to limit the diversity of altered devices that may derive from vapor phase processing of Lens Precursors 601 and lens objects.

The invention claimed is:

1. An apparatus for processing a Lens Precursor, the apparatus comprising:
    a mandrel with an arcuate surface for supporting said Lens Precursor;
    a chamber enclosing a vapor phase environment proximate to the Lens Precursor and at least a portion of the arcuate surface of the mandrel, wherein said vapor phase environment affects at least one physical property of the Lens Precursor during processing;
    an inlet for admitting one or both of a gas and a liquid into said chamber; and
    a registration feature for aligning the apparatus with an external device, wherein said external device comprises a digital mirror device as a source of voxel by voxel radiation, and wherein the processing of the Lens Precursor is done in a Free Form manner on a voxel by voxel basis within said chamber.

* * * * *